(12) United States Patent
Majumder et al.

(10) Patent No.: US 8,913,838 B2
(45) Date of Patent: Dec. 16, 2014

(54) VISUAL INFORMATION PROCESSING ALLOCATION BETWEEN A MOBILE DEVICE AND A NETWORK

(71) Applicant: Alcatel-Lucent USA Inc., Murray Hill, NJ (US)

(72) Inventors: Anirban Majumder, Bangalore (IN); Samik Datta, Bangalore (IN); Sharad Jaiswal, Bangalore (IN); Nisheeth Shrivastava, Bangalore (IN); Sreedal Menon, Bangalore (IN); Shubham Toshniwal, Agra (IN)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/780,507

(22) Filed: Feb. 28, 2013

(65) Prior Publication Data
US 2014/0241638 A1 Aug. 28, 2014

(51) Int. Cl.
*G06K 9/62* (2006.01)
*H04W 24/00* (2009.01)
*G06K 9/00* (2006.01)

(52) U.S. Cl.
CPC ........... *G06K 9/00536* (2013.01); *H04W 24/00* (2013.01)
USPC ........................................ 382/224

(58) Field of Classification Search
CPC ........ H04W 4/00; H04W 12/00; H04W 12/08
USPC ........... 382/190, 224; 707/769; 709/217, 224; 455/73, 425, 437, 456.1; 342/386, 457
See application file for complete search history.

(56) References Cited

U.S. PATENT DOCUMENTS

| | | | |
|---|---|---|---|
| 8,509,806 B2 * | 8/2013 | West et al. .................. | 455/456.1 |
| 8,565,771 B1 * | 10/2013 | Klein et al. .................... | 455/437 |
| 2010/0306249 A1 * | 12/2010 | Hill et al. ........................ | 707/769 |
| 2013/0007201 A1 * | 1/2013 | Jeffrey et al. .................. | 709/217 |
| 2013/0303159 A1 * | 11/2013 | Gathala et al. ................. | 455/425 |
| 2014/0187177 A1 * | 7/2014 | Sridhara et al. ................. | 455/73 |

* cited by examiner

*Primary Examiner* — Amir Alavi
(74) *Attorney, Agent, or Firm* — Carlson, Gaskey & Olds

(57) ABSTRACT

An illustrative mobile device includes a data storage configured to at least temporarily store visual information and at least one processor that is configured to determine whether to request visual information processing from a network with which the mobile device may communicate. The processor is configured to determine a mobile device condition and a network condition. The processor determines a type of feature from the visual information to use for classification based on the determined mobile device and network conditions. The processor is configured to classify the visual information based on the determined type of feature and determine a confidence indicator based on the classification. The processor determines whether to request visual information processing from the network based on the determined confidence indicator.

20 Claims, 3 Drawing Sheets

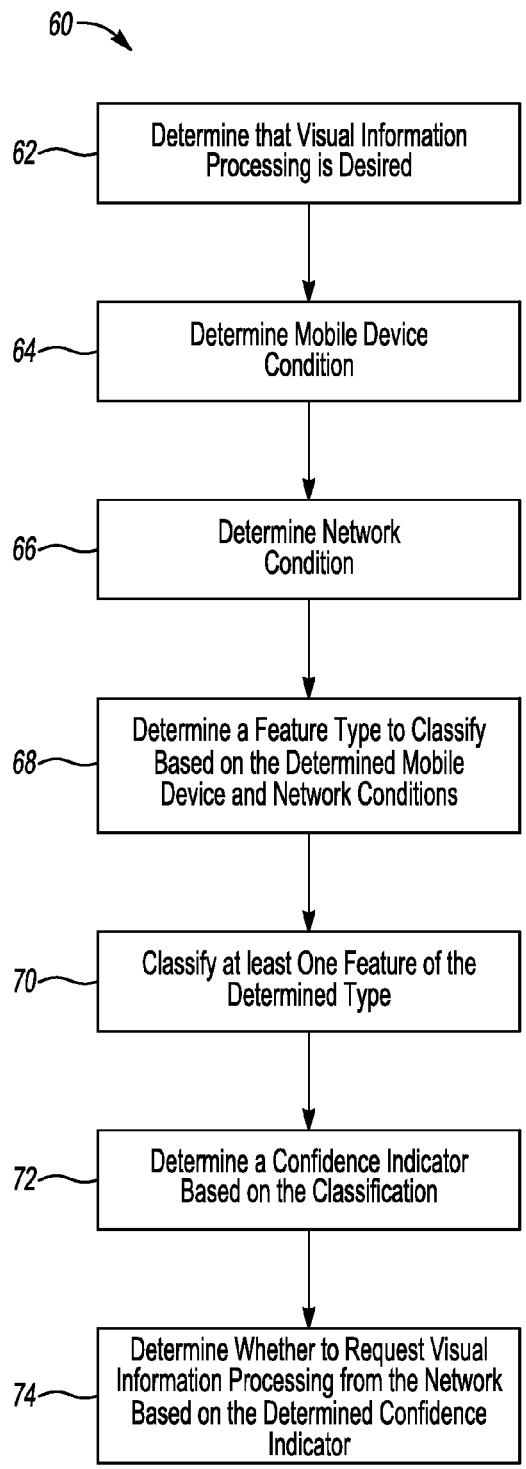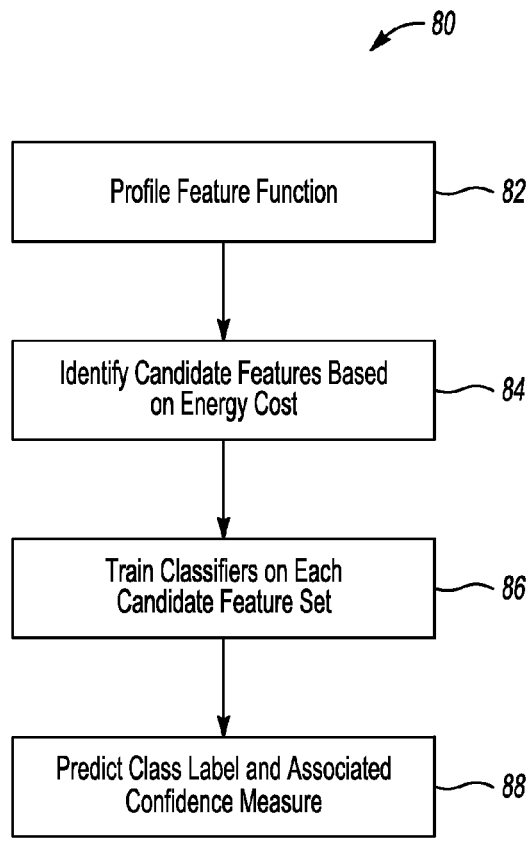
Fig-3
Fig-4

ND A NETWORK

VISUAL INFORMATION PROCESSING ALLOCATION BETWEEN A MOBILE DEVICE AND A NETWORK

TECHNICAL FIELD

This disclosure generally relates to processing visual information. More particularly, without limitation, this disclosure relates to allocating a visual information processing task to a mobile device or a network.

DESCRIPTION OF THE RELATED ART

Object recognition techniques have been used for a variety of purposes. Recent developments have resulted in including object recognition capabilities on mobile devices, such as mobile phones. Object recognition capability on a mobile device provides enhanced features, such as an intelligent virtual assistant for locating information on the Internet based on visual data that represents an object.

Object recognition techniques can be used to classify an image or video frame, for example, into a predefined category. One drawback with many object recognition techniques is that they require a significant amount of computing. Using traditional techniques may result in quickly using up available battery power if the computing task is completed by a processor on a battery-powered mobile device. Additionally, computation on a mobile device may be slow, which introduces latency into the object recognition process.

Although assigning the computing functions for object recognition to a network with which the mobile device is associated may save the battery power of the mobile station or may provide quicker results it does not come without a cost. The amount of data transfer associated with the network performing the object recognition tasks can place a burden on the network, force a user to purchase a more expensive data plan, or both.

SUMMARY

An illustrative mobile device includes a data storage configured to at least temporarily store visual information and at least one processor that is configured to determine whether to request visual information processing from a network with which the mobile device may communicate. The processor is configured to determine a mobile device condition and a network condition. The processor determines a type of feature from the visual information to use for classification based on the determined mobile device and network conditions. The processor is configured to classify the visual information based on the determined type of feature and determine a confidence indicator based on the classification. The processor determines whether to request visual information processing from the network based on the determined confidence indicator.

An illustrative method of allocating a visual information processing task between a mobile device and a network with which the mobile may communicate includes determining a mobile device condition and a network condition of a network with which the mobile device may communicate. A type of feature from the visual information to classify is determined based on the determined network condition and mobile device condition. The visual information is classified based on the determined type of feature. The method also includes determining a confidence indicator based on the classification and determining whether to request visual information processing from the network based on the determined confidence indicator.

Various embodiments and their features will become apparent to those skilled in the art from the following detailed description of at least one example embodiment. The drawings that accompany the detailed description can be briefly described as follows.

BRIEF DESCRIPTION OF THE DRAWINGS

FIG. 3 is a flow chart diagram summarizing an example process of allocating a visual information processing task between a mobile device and a network with which the mobile device may communicate.

FIG. 4 is a flow chart diagram summarizing an example training process useful with the process summarized in FIG. 3.

DETAILED DESCRIPTION

A mobile device or method as described below facilitates allocating a computing task associated with processing visual information, such as object recognition, between a mobile device and a network with which the mobile device may communicate. The disclosed examples allow for avoiding draining the battery of a mobile device by allocating a visual information processing task to the network when the task would undesirably require a significant amount of a remaining charge on the battery. The disclosed examples also allow for avoiding burdening a network with large amounts of data transfer when it is not necessary to allocate a visual information processing task to the network.

Figure 1:
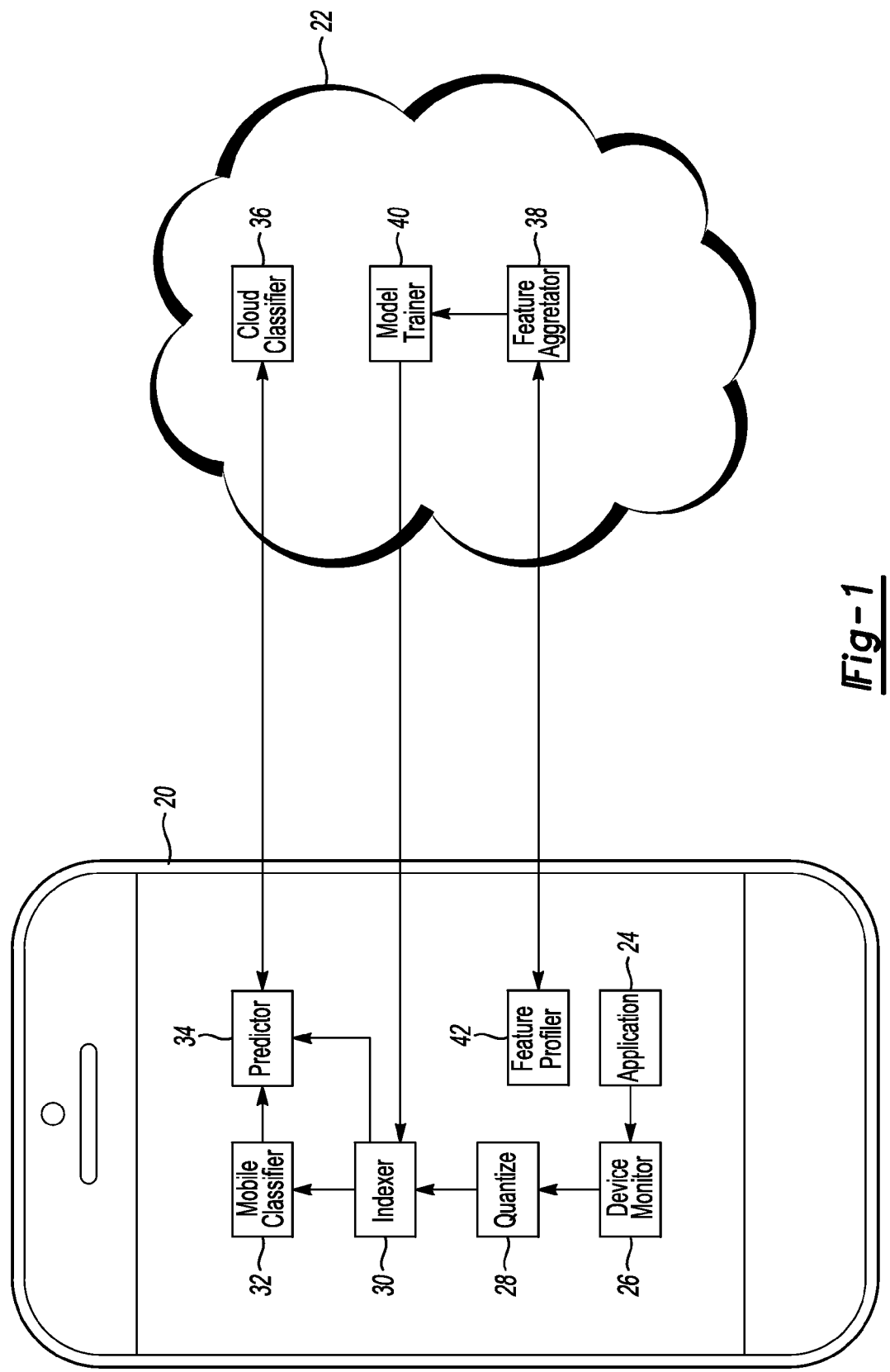
FIG. 1 schematically illustrates an example mobile device configuration according to one example embodiment of this invention.

FIG. 1 schematically illustrates an example mobile device 20 and a network 22 with which the mobile device 20 may communicate. For discussion purposes, the mobile device 20 will be considered a mobile phone with an ability to have visual information at least temporarily stored in a memory of the mobile device 20. The visual information may be image or video data that is provided to the mobile device from a source that is accessible over the network 22 or image or video data acquired by a camera of the mobile device.

The mobile device 20 includes a plurality of modules that are configured to facilitate processing visual information. The modules may be realized as a portion of at least one processor of the mobile device 20 or as software, for example, stored on a data storage of the mobile device 20.

The illustrated example includes at least one application module 24 that allows for some visual information processing. For discussion purposes, the application module 24 includes at least one feature that uses or requires object recognition from visual information. The mobile device 20 uses at least one of a variety of ways of recognizing when some visual information processing is desired or required.

A device monitor module 26 is configured to determine condition of the mobile device 20 that is indicative of whether the mobile device has capacity to complete the visual information processing task. In one example, the determined condition is based on information such as a charge level of a battery of the mobile device 20. The device monitor module 26 provides an indication of the mobile device condition to a quantizer module 28.

The device monitor module 26 also determines a network condition of the network 22, which is indicative of whether the current status of the network will allow for the network 22 to efficiently or effectively communicate with the mobile device 20 for carrying out the visual information processing task, such as the computing necessary for object recognition. The network condition in one example is based on a network interface with the mobile device 20 (e.g., whether it is a Wi-Fi, 3G or 4G connection), round trip time or latency information, and a current data rage, for example. The device monitor module 26 provides an indication of the network condition to the quantizer module 28.

The quantizer module 28 quantized the mobile device condition and the network condition, respectively, into a predefined, discrete level. The quantized conditions are provided to an indexer module 30, which determines a processing model based on the mobile device condition and the network condition. In one example, the indexer module 30 has a plurality of predetermined processing modules that are associated with sets of quantized mobile device conditions and quantized network conditions. The indexer module 30 in such an example determines which of the predetermined models has associated condition values that correspond to the quantized condition information determined by the device monitor module 26 and the quantizer module 28.

The processing model includes at least one type of feature from the visual information to be classified. A classifier module 32 extracts corresponding features from the visual information (e.g., video frame or image file) and performs a known type of classification. The result provided by the classifier module 32 includes an indication of the classification of the visual information and a confidence indicator.

A predictor module 34 determines a relationship between the confidence indicator from the classifier module 32 and a classification threshold. In one example, the classification threshold is part of the model that is corresponds to the values of the quantized mobile device and network conditions. The predictor module 34 determines whether the confidence indicator from the classifier module 32 indicates that the classification provided by the classifier module is sufficiently accurate to use the classified visual information as processed by the mobile station. If the confidence indicator reveals a sufficient accuracy associated with the classification based on the extracted features, then no further processing is required from the network 22.

If, on the other hand, the confidence indicator reveals that the accuracy from the mobile device processing is insufficient to satisfy a desired accuracy level, then the predictor module 34 provides an indication that a cloud classifier module 36 should process the extracted features for classification. The cloud classifier module 36 is a highly accurate object recognition system in some examples. A known classification technique, such as a multiple kernel learning (MKL) technique, provides sufficient accuracy for object recognition. Although only one cloud instance of a cloud classifier module 36 is illustrated, in some examples more than one instance of the cloud classifier module 36 may be utilized to parallelize the feature extraction and classification.

The processing models are configured to accommodate the current mobile device condition and the current network condition. For example, the feature type and classification technique are specified, in part, to allow the processing at the mobile device to fit within constraints imposed by the current mobile device condition (e.g., battery charge level). In some cases, the achieved accuracy will correspond to a desired minimum accuracy level for a given type of feature. In other cases it will not, which may be due to the mobile device not having enough power left for a more accurate classification or a different type of feature to be extracted. Utilizing the predetermined model allows for allocating the visual information processing task between the mobile device 20 and the network 22 in a manner that accommodates the condition of each.

The example of FIG. 1 also includes a feature aggregator module 38 associated with or part of the cloud network 22. The feature aggregator module pushes new feature functions to be profiled on the mobile device 20 to a feature profiler 42 module of the mobile device 20. The feature profiler module 42 passively profiles new feature functions provided by the network 22 according to their corresponding mobile device and network conditions and associated accuracy. In one example, the feature profiler module 42 runs in the background and can be executed whenever the battery charge level is sufficiently high or the mobile device 20 is coupled with a source of electrical power (e.g., plugged into a charger).

A model trainer module 40 of the cloud network 22 trains all the classifiers on the cloud. In this example, each combination of a quantized mobile device condition and a quantized network condition has one classifier assigned to it as part of the processing model. The trained classifiers and the associated models are provided to the indexer module 30 where they are available to be used on the mobile device 20. The model trainer module 40 is used to predetermine the processing models and updates a listing of models (with associated mobile device and network conditions) whenever a new training data set or feature function becomes available to the network 22.

Figure 2:
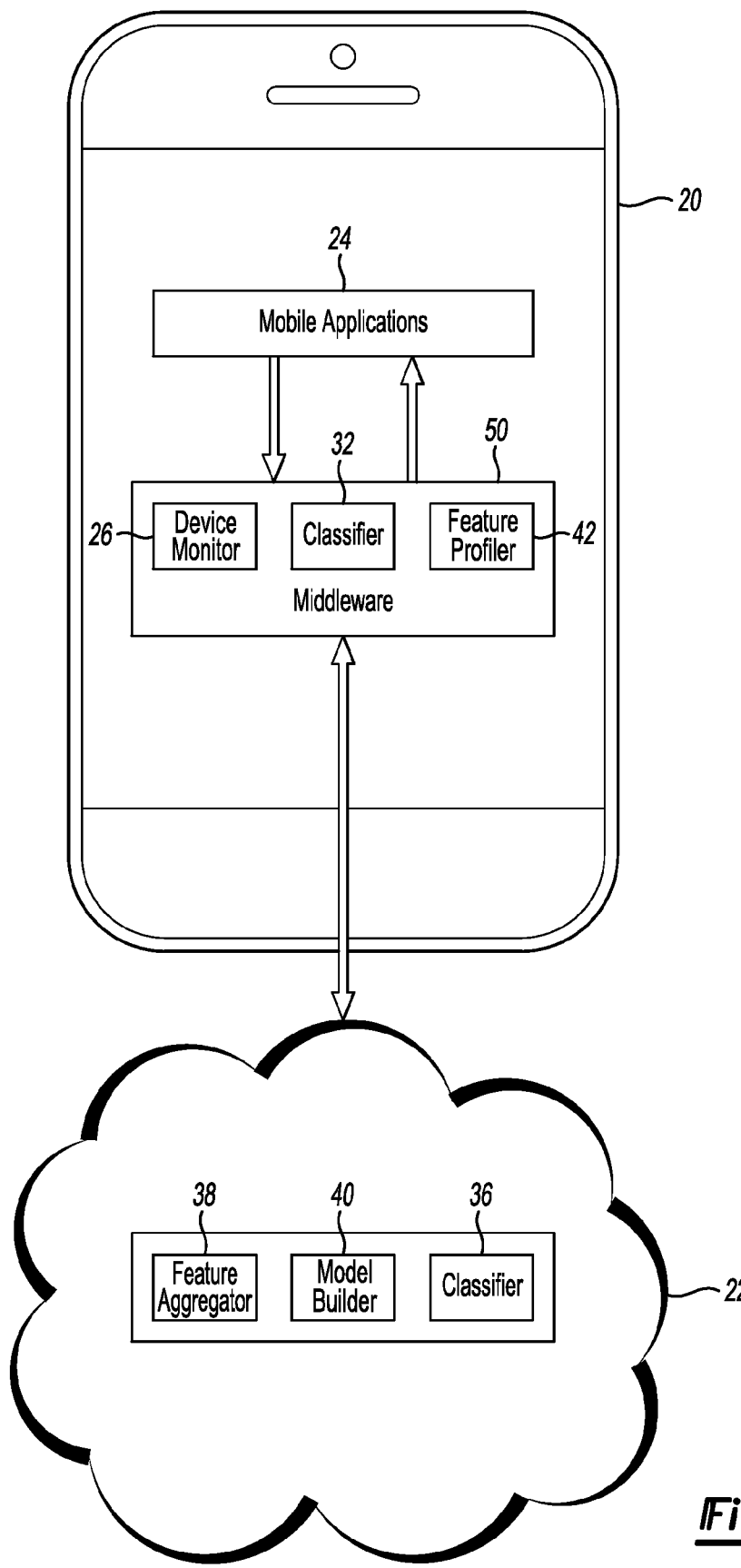
FIG. 2 schematically illustrates an example mobile device configuration according to one example embodiment of this invention.

FIG. 2 schematically illustrates another example embodiment that includes essentially the same performance features and modules as in the example of FIG. 1, which are indicated by the same reference numbers in both drawings. The example of FIG. 2 has a different arrangement of the various modules involved in processing visual information. In this example, the mobile device 20 includes a middleware layer 50 that is configured to perform the visual information processing tasks. The middleware layer 50 exposes various application programming interfaces (APIs). Mobile applications shown collectively at 24 in the illustration can use the APIs for accomplishing visual information processing tasks, such as object recognition.

In the example of FIG. 2, the middleware layer 50 receives a request from one of the applications 24 indicating a need for visual information processing. The middleware layer 50 queries the device monitor module 26, which provides an indication of the mobile device condition and the network condition as described above. The middleware layer 50 includes the functionality of the indexer module, mobile classifier module 32 and predictor module 34 as described above (even though only the classifier module 32 is specifically shown in FIG. 2 to simplify the drawing). The middleware layer 50 is configured to determine the processing model to use based on the mobile device condition and the network condition. That model dictates the type of features to be classified and the confidence indicator threshold. The middleware layer 50 performs the feature extraction, classification and confidence indicator determination. The middleware layer 50 also determines whether processing by the network 22 is needed based on the determined confidence indicator.

Providing a middleware layer 50 may provide efficiencies in task division and assignment on the mobile device 20. For example, the applications 24 need not be configured for making any determinations regarding whether an object recognition task can be performed on the mobile device 20 but, instead, only need to use the APIs exposed by the middleware layer 50.

FIG. 3 summarizes an example method of allocating a visual information task between the mobile device 20 and the network 22 in a flowchart diagram 60. At 62, a determination is made (by the middleware layer 50, for example) that visual information processing is desired. This may be the result of a user attempting to find information on the Internet regarding an object in an image captured using the camera of the mobile device 20. The processing of the visual information begins with a mobile device condition determination at 64. At this step the device monitor module 26 provides an indication of the energy cost associated with having the mobile station 20 perform the requested processing. For example, the mobile device condition may be based on the battery charge level, processor occupancy, available computation power and available memory. At 66 the network condition is determined by the device monitor module 26 using information such as the type of link between the mobile device 20 and the network 22, the latency of the network 22 and the current data rate.

The mobile device condition determined at 64 and the network condition determined at 66 are each quantized (i.e., by the quantizer module 28) as parameter values that are considered cost function values in one example. Distinct quantized levels are used in some embodiments. The quantized values are identified within a predetermined listing of pairings or sets of corresponding values with each set being associated with a particular processing model. The processing models are intended to establish a set of criteria to be used to accommodate the current mobile device and network conditions.

Establishing or determining the processing models in one embodiment is accomplished separate from the mobile device 20 in the following manner, which is summarized in the flowchart 80 of FIG. 4. Considering an image as an example of visual information containing at least one object that should be identified, the image may be treated as a two dimensional array of respective intensities at each pixel location. For simplicity, assume that the image is grayscale. Any object recognition framework includes feature extraction and classification. Feature extraction includes transforming the image into a k-dimensional vector, which quite often is a local descriptor (e.g. SIFT, SURF, HOG) that provides scale, rotation and illumination invariance. The extracted feature will be used in the classification step. For discussion purposes, assume that there is training data comprising K classes of objects. Example known support vector machine (SVM) based frameworks (e.g., Multiple Kernel Machine) are known to achieve highest accuracy in object recognition. Each possible feature type has an associated kernel function (e.g., gaussian, chi-squared, spatial pyramid kernel, etc.).

This embodiment includes profiling each feature function at 82 based on the energy cost (i.e., the mobile device condition) and the test accuracy of the feature-kernel combination. Candidate features are identified for each combination of quantized mobile device and network condition at 84. The candidate features are selected in this example so that the energy cost does not exceed the energy cost function corresponding to the mobile device condition and so that a maximum accuracy for those features may be achieved. In other words, the feature profiling is intended to fit within the capabilities of the mobile while providing the best available accuracy under those constraints. One example includes using a known optimization problem, such as the knapsack problem, which can be solved efficiently in polynomial time.

Feature extraction may contribute to the majority (e.g., approximately 90%) of the classification cost. Therefore, this embodiment includes optimizing the feature extraction step to provide a benefit on the classification cost.

The model trainer module 40 of the network 22 trains classifiers on each candidate feature set at 86 by building a support vector based classifier on the training data. One example includes learning a kernel function, which may be accomplished using known Multiple-Kernel-Learning (MKL), that is useful for object recognition problems. The classifier predicts its class label along with a confidence measure at 88. The confidence measure of this classifier is defined as the distance of the test data point from the margin, mapped to the interval [0, 1] via the sigmoid function. The confidence measure corresponds to the confidence indicator mentioned above.

The role of the predictor module 34 will be to analyze the confidence score given as an output by the classifier in the last stage and predict whether to accept its class label (as determined by the mobile classifier module 32) or send the image to the cloud network 22 for final classification. This classifier module 32 is trained with the network cost function parameter (i.e., the network condition indicator) and learns a confidence indicator threshold. If the classification confidence is below that threshold, the image processing will be requested from the cloud network 22. For these instances, the final classification takes place on the network 22 (i.e., by the classifier module 36) and the results are sent back to the mobile device 20. In some embodiments, only a fraction of data points for which confidence is below the threshold, are sent to the cloud network 22. The remaining processing tasks are completed on the mobile.

Referring again to FIG. 3, given the predetermined processing models for each pairing or set of mobile device condition and network condition, the indexer module 30 determines the feature type to use for classification by identifying the processing model that corresponds to the current quantized mobile device and network conditions at 68. The mobile classifier module 32 extracts the appropriate feature and classifies it at 70. The mobile classifier module 32 also determines the confidence indicator at 72.

At 74, the predictor module 34 determines whether to request processing from the network 22 based on a relationship between the confidence indicator determined at 72 and the confidence threshold that is part of the processing model being used. In one example, if the determined confidence indicator is equal to or more than the threshold, the classification provided by the mobile classifier module 32 is accepted for the processing task (e.g., object recognition). If, however, the confidence indicator is below the threshold, the predictor module 34 requests processing from the classifier module 36 of the network 22.

The disclosed examples facilitate using a mobile station's computing capabilities for visual information processing in a manner that avoids draining the mobile device's battery power or consuming all of the mobile's computing power or memory while having the benefit of obtaining a desired degree of accuracy. When needed, processing from a network is requested but that is done on a limited basis to avoid unnecessarily burdening the network. The disclosed examples address the problem of how and where to process visual information (e.g., perform object recognition using image or video data) in a holistic manner from a computation and data splitting perspective.

The preceding description is illustrative rather than limiting in nature. Variations and modifications to the disclosed examples may become apparent to those skilled in the art that do not necessarily depart from the essence of the contribution to the art provided by the disclosed embodiments. The scope of legal protection can only be determined by studying the following claims.

We claim:

1. A mobile device, comprising:
   a data storage configured to at least temporarily store visual information; and
   at least one processor configured to determine a mobile device condition;
   determine a network condition of a network with which the mobile device may communicate;
   determine a type of feature from the visual information to classify based on the determined mobile device and network conditions;
   classify the visual information based on the determined type of feature;
   determine a confidence indicator based on the classification; and
   determine whether to request visual information processing from the network based on the determined confidence indicator.

2. The mobile device of claim 1, wherein
   the at least one processor is configured to determine a visual information processing model based on the determined mobile device condition and network condition;
   the visual information processing model includes the type of feature to classify and a confidence indicator threshold; and
   the at least one processor determines whether to request visual information processing from the network based on a relationship between the determined confidence indicator and the confidence indicator threshold.

3. The mobile device of claim 2, wherein the at least one processor is configured to request visual information processing from the network if the determined confidence indicator is below the confidence indicator threshold.

4. The mobile device of claim 2, wherein the at least one processor is configured to utilize the classification of the classified at least one feature if the determined confidence indicator is equal to or greater than the confidence threshold.

5. The mobile device of claim 1, wherein the at least one processor is configured to
   request visual information processing from the network when the confidence indicator indicates that the classified at least one feature is not acceptably classified; and
   use the classification of the classified at least one feature when the confidence indicator indicates that the classification is acceptable.

6. The mobile device of claim 1, wherein
   the data storage includes a plurality of predetermined relationships between respective mobile device conditions, network conditions and the type of features from the visual information to classify; and
   the at least one processor is configured to determine the type of feature from the visual information to classify by determining which of the predetermined relationships corresponds to the determined mobile device and network conditions.

7. The mobile device of claim 6, wherein
   the plurality of predetermined relationships include respective predetermined confidence indicator thresholds; and
   the at least one processor is configured to determine whether to request visual information processing from the network based on a relationship between the determined confidence indicator and the predetermined confidence indicator threshold from the predetermined relationship that corresponds to the determined mobile device and network conditions.

8. The mobile device of claim 1, wherein
   the mobile device condition is indicative of a visual information processing capacity of the mobile device; and
   the network condition is indicative of an ability of the network to handle information transfer associated with the processing of the visual information.

9. The mobile device of claim 8, wherein the mobile device condition includes an indication of a charge level of a battery of the mobile device.

10. The mobile device of claim 1, wherein the visual information comprises at least one of an image or at least a portion of a video.

11. A method of allocating a visual information processing task between a mobile device and a network with which the mobile may communicate, the method comprising the steps of:
    determining a mobile device condition;
    determining a network condition of a network with which the mobile device may communicate;
    determining a type of feature from the visual information to classify based on the determined network condition and mobile device condition;
    classifying the visual information based on determined type of feature;
    determining a confidence indicator based on the classification; and
    determining whether to request visual information processing from the network based on the determined confidence indicator.

12. The method of claim 11, comprising
    determining a visual information processing model based on the determined mobile device condition and network condition, wherein the visual information processing model includes the type of feature to classify and a confidence indicator threshold; and
    determining whether to request visual information processing from the network based on a relationship between the determined confidence indicator and the confidence indicator threshold.

13. The method of claim 12, comprising requesting visual information processing from the network if the determined confidence indicator is below the confidence indicator threshold.

14. The method of claim 12, comprising utilizing the classification of the classified at least one feature if the determined confidence indicator is equal to or greater than the confidence threshold.

15. The method of claim 11, comprising
    requesting visual information processing from the network when the confidence indicator indicates that the classified at least one feature is not acceptably classified; and
    using the classification of the classified at least one feature when the confidence indicator indicates that the classification is acceptable.

16. The method of claim 11, wherein
    the data storage includes a plurality of predetermined relationships between respective mobile device conditions, network conditions and the type of features from the visual information to classify; and
    the method comprises determining the type of feature from the visual information to classify by determining which of the predetermined relationships corresponds to the determined mobile device and network conditions.

17. The method of claim 16, wherein
the plurality of predetermined relationships include respective predetermined confidence indicator thresholds; and
the method comprises determining whether to request visual information processing from the network based on a relationship between the determined confidence indicator and the predetermined confidence indicator threshold from the predetermined relationship that corresponds to the determined mobile device and network conditions.

18. The method of claim 11, wherein
the mobile device condition is indicative of a visual information processing capacity of the mobile device; and
the network condition is indicative of an ability of the network to handle information transfer associated with the processing of the visual information.

19. The method of claim 18, wherein the mobile device condition includes an indication of a charge level of a battery of the mobile device.

20. The method of claim 11, wherein the visual information comprises at least one of an image or at least a portion of a video.

* * * * *